Figure 1:
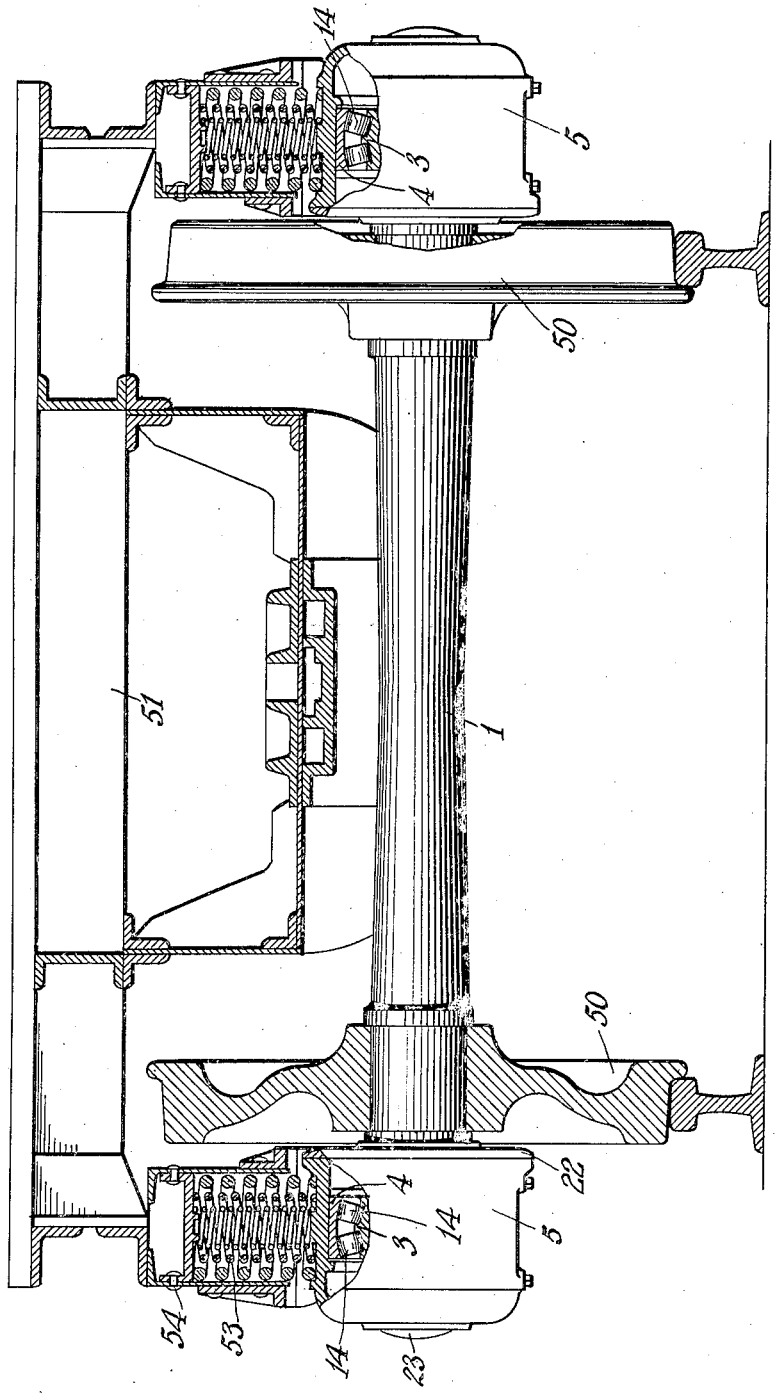

April 22, 1924.

H. E. BRUNNER

CAR AXLE JOURNAL

Filed Oct. 5, 1923

1,491,333

2 Sheets-Sheet 1

Inventor
Harold E. Brunner

By his Attorneys
Rogers, Kennedy Campbell

April 22, 1924. 1,491,333

H. E. BRUNNER

CAR AXLE JOURNAL

Filed Oct. 5, 1923 2 Sheets-Sheet 2

Inventor
Harold E. Brunner
By his Attorneys
Rogers, Kennedy-Campbell

Patented Apr. 22, 1924.

1,491,333

UNITED STATES PATENT OFFICE.

HAROLD E. BRUNNER, OF LARCHMONT, NEW YORK, ASSIGNOR TO THE SKAYEF BALL BEARING COMPANY, A CORPORATION OF CONNECTICUT.

CAR-AXLE JOURNAL.

Application filed October 5, 1923. Serial No. 666,671.

*To all whom it may concern:*

Be it known that I, HAROLD E. BRUNNER, a citizen of the United States, residing at Larchmont, in the county of Westchester and State of New York, have invented certain new and useful Improvements in Car-Axle Journals, of which the following is a specification, reference being had therein to the accompanying drawing.

This invention relates to the mounting of anti-friction bearings of the roller type on the journals of railway cars.

One of the problems which confronted the anti-friction bearing engineer in converting the journal bearings for car axles from the plain type to a type containing rolling elements, either balls or rollers, was the fact that the bearings would fail when mounted in accordance with the best engineering practice in mounting other rotary elements upon such bearings, and that even upon bringing to bear on the problem wide and up-to-date experience obtained in the automotive field, there was still failure. This was attributed to many causes. I have discovered that the bearings to function properly and to endure must have a certain amount of lateral freedom comparable with that obtained in plain bearing practice in which a condition of looseness is present. Attempts which were made in the past to apply anti-friction bearings to railway vehicles have been uniformly unsuccessful, the difficulty being caused primarily by the mounting design of these applications. The designers of these mountings, for reasons which doubtless seemed sufficient to them, did not follow this plain bearing practice. Conditions are such in these mountings that the bearing is subjected to numerous forms of constraint resulting in high stresses within the bearing soon leading to premature failure. "Constraint" in this connection has reference to any interaction between the parts of a bearing which, through a cramping tendency, develops localized stresses that are superimposed upon those due to the working load. In addition to the disastrous results upon the bearings themselves, the constrained type of mounting has reflected very unfavorably in the riding qualities of the car itself, there being a tendency to excessive and "jerky" transverse oscillations.

In an effort to remedy these conditions and devise a mounting which will relieve both the bearings and the vehicle from the objections cited above, I have devised a new principle in the application of anti-friction bearings to railway vehicles. The invention comprises means for obtaining the free and unconstrained mounting of the bearing together with provision for permitting a lateral float comparable with that obtained in standard plain bearing practice.

Consideration of the operating conditions encountered in railway service conclusively demonstrated a further necessity; that of a freely aligning axle. This is necessary in the first place to compensate for vertical irregularities in the track and road bed. In the second place it is required by the very appreciable distortion developed in the elements of the truck frame itself under the stress of operating conditions. To provide for these contingencies, I conceived the use of an axle fitted with an inherently self-aligning anti-friction bearing on each journal. This permits free angular displacement about either vertical or horizontal axes and at the same time relieves the bearing from the secondary cramping stresses heretofore referred to.

The general practice followed in American railway construction of providing a diagonal relation in the location of rail joints together with the form of automatic coupler universally used, results in a very undesirable tendency to transverse oscillation of the car body as a whole. Such action is not detrimental in the case of standard type of plain bearing inasmuch as the lateral float provided between the thrust collars allows a free movement of the car body and truck frame independent of the wheel and axle. The initial looseness is about ⅜ of an inch, increasing by wear to ¾ of an inch, at which point new collars are applied. If such lateral freedom be not provided there will result severe thrust stresses on the bearings due to the tendency to transverse oscillation and also an undesirable stiffness in the riding qualities of the car.

In the present illustration, which embodies my invention substantially as practicably applied to railway passenger trains, the axle with the wheels fast upon it is permitted to weave back and forth from side to side of the car as the inequalities of the track may move the axle relatively to the car or induce swinging of the car or cause this to move in relation to the wheels and axle.

It has also been found desirable, when roller bearings are used in this situation, to have a single roller bearing at each end of the axle, that is, one roller bearing at each journal, and to have such roller bearing capable not only of supporting the radial load applied to it, but also the thrust load, which, in this class of work, constitutes quite a considerable factor. The freedom allowed must not be so excessive that there will be an undue amount of weaving. A small amount of movement prevents the bearings from breaking incident to the sudden change of direction of thrust load, but does not interfere with their properly taking up and carrying that thrust load after the sidewise movement has gone to a sufficient extent.

When the train is running upon a substantially straight track, that is, one which has no real curves from side to side, the entire structure assumes a position of equilibrium where there is an easy side sway, but which does not need to be checked by the anti-friction bearings in their thrust capacity or function; consequently by allowing a small amount of capability for this independent movement the bearings practically carry pure radial load except that at the curves and those conditions which arise which cause a considerable lateral movement.

The term lateral here used is in respect of the sides of the bearings or the direction of movement of the train or the direction of the tracks or the length of the car. It is equally applicable to all of these, and when the term lateral is used it also is synonymous with axial when referring to the normal axis of rotation of the axle and the journal.

In the drawings forming a part of this application one practicable embodiment of the invention is illustrated, in which drawings—

Figure 2:
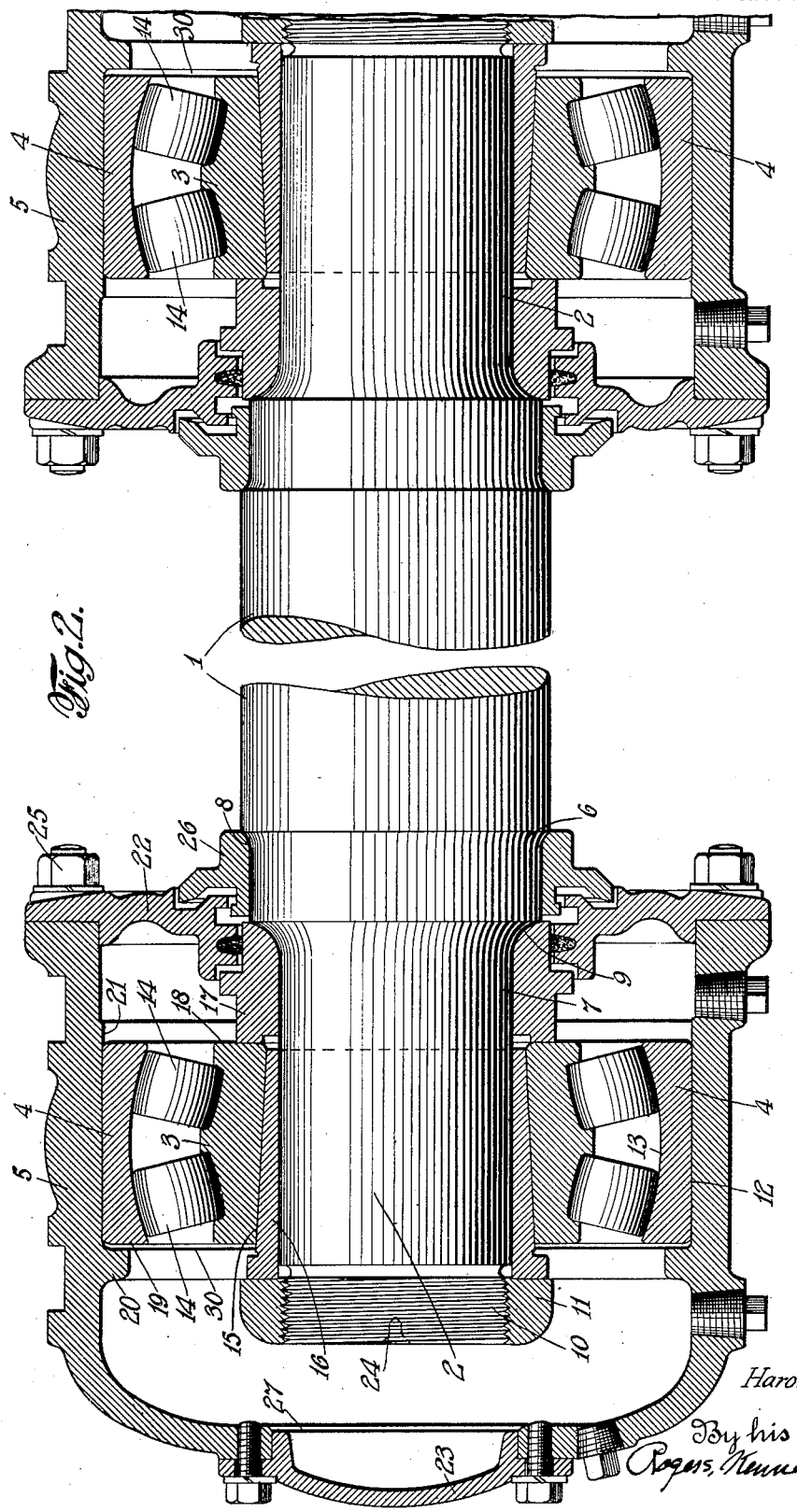

Figure 1 is a view partly in elevation and partly in section showing the invention applied to the truck and axle of a railway car, and Fig. 2 is an enlarged view showing in section the bearings and housings and a broken away axle in elevation, the plane of the section being vertical and at about the axis of the axle.

The car axle, 1, is shown having at each end a journal portion, 2. The wheels, 50, are shown mounted according to the usual practice inwardly of the journals and under the truck framework, 51. As the journals at the respective ends are substantially the same, as are also the housings and parts mounted thereon, a detailed description of one will be found sufficient for the other.

A two-row self-aligning roller-bearing is mounted upon the journal at each end of the axle, the inner rings, 3—3, being shown rigidly secured in place. The outer rings, 4—4, are mounted in housings, 5—5, with a limited amount of lateral freedom, the housing laterally of the outer side of the ring being provided with a flange, 20, the ring being perfectly free to move inwardly of the housing but being limited in its outward movement by this flange. In mounting the housings on the car, or mounting the bearings upon the shaft in relation to such housing mountings there is left about one-eighth of an inch space between each outer ring and its adjacent limiting flange. This will give a combined lateral movement of about one-quarter of an inch, and small as this space is in comparison with the length of the car axle yet it is sufficient to permit a free weaving of the axle back and forth from side to side under the car while this is in motion.

The journal portion is formed by two reductions, 6 and 7, leaving outwardly facing shoulders, 8 and 9, the purposes of which will presently be explained. Beyond the journal portion, 2, is a screw threaded end, 10, for receiving the nut, 11. In practice a lock nut has been found useful, but as the form of such fastening does not constitute a part of this invention the drawing will not be complicated with showing details of features which are merely collateral. Surrounding the journal is the housing, 5, which at its outer portion is formed for connection in some suitable or well known manner with the body or frame of the railroad car which is to be supported. The springs, 53, within the pedestal, 54, serve as a connecting means between the housings, 5, and the truck or framework of the car.

The two-row roller-bearing herein illustrated is self-aligning and is of the adapter type, the outer ring, 4, having a substantially cylindrical outer surface, 12, and a spherical inner surface, 13, constituting the raceway for the two rows of curved rollers, 14. These rollers run in suitable raceways formed in the inner ring, 3, of the bearing, the bore, 15, of which ring is tapered for receiving the tapered adapter sleeve, 16, which has a close fit upon the journal, 2. The outer end of the sleeve, 16, is engaged by the nut, 11, and by it forced inwardly into the tapered bore, 15, the bearing ring being positioned and held from further inward movement by means of a collar, 17, mounted upon the inner portion of the journal and engaging the shoulder, 9. By this means the bearing is positively positioned laterally, that is, its side face, 18, is held at a predetermined position longitudinally of the axle, and securely and rigidly locked in place. These bearings are manufactured to very close tolerances; consequently when one side face of the bearing is positioned the variation of the position of the other side face, or the side face, 19, of the other ring at the other side is unquestionable. The housing is formed with a flange, 20, disposed laterally of the outer side face, 19, of the outer ring, 4, of the bearing. The bore, 21, of the housing for receiving the outer face, 12, of the outer ring of the bearing is so proportioned in relation thereto, that there is a nice sucking fit between the parts. This bore, 21, is somewhat longer than the width of the outer ring, so this may move laterally and toward and from the flange, 20.

In mounting the structure of the two housings upon the car or other superstructure, care must be taken that when the parts are in their normal position a certain amount of clearance is present between both the outer rings and their limiting flanges, 20, so that the axle and the anti-friction bearing may move a limited amount in either direction from the normal position assumed by the parts when in equilibrium.

Since there is but little tendency for the housing to move outwardly, and this only taking place when the structure comprising the axle, wheels, and housings have been removed from the car, a cover plate, 22, in the form of a labyrinth has been found sufficient to keep the parts in position. Of course, it is well understood that the roller bearings will outlast the life of the wheels and that the roller bearings do not need to be taken out of the housing or taken apart as often as the wheels have to be trued up. When it is desired to true up the wheels, and nothing more, it is merely necessary to unfasten the housings from the superstructure and remove the end plates, 23, whereupon access is given to the lathe centers, 24, at the ends of the journals. When, however, it is desired to get access to the bearings themselves, or to remove the housing from the bearing the nuts, 25, will be removed whereupon the housing may be slid away from the end plate, 22, and removed from the outer ring of the bearing. The bearing may then be taken off in the usual manner by unfastening the nut, 11, and relieving the adapter sleeve, 16. In some instances access may be had to the bearing for inspecting the rollers and replacing defective rollers by merely unfastening the end plate, 22, moving the housing partly from the outer ring and then tipping the housing and the outer ring relatively to the rollers. This gives access to the inner row of rollers. Access to the outer row may be had through the end opening covered by the plate, 21. A labyrinth is partly supplied by the conformation of the back stop ring, 17, in conjunction with a ring, 26, mounted upon the portion, 6, of the axle and normally resting against the shoulder, 8. When it is desired to remove the housing and the bearing, the nut, 11, is unscrewed through the opening, 27, and the entire structure slipped over the journal, with the exception of the labyrinth member, 26, which may be removed with the other parts or left in position as desired.

It is to be understood, of course, that the showing herein is illustrative of my invention, and that various changes in details may be made within the scope of the claims without departing from the spirit of the invention.

I claim as my invention:

1. The combination with a car axle having journals at its respective ends, of a framework, a pair of housings mounted thereon, a pair of combined radial and thrust roller bearings, each comprising an inner and an outer ring and rollers therebetween, the inner rings being mounted fast on the journals, the outer rings being mounted in the housings and capable of lateral movement therein, and the housings having means for limiting the amplitude of such movement.

2. The combination with a rotary car axle, of a framework, a pair of housings, pedestals mounted on the framework for embracing the housings and holding these in fixed relation one to the other, a pair of combined radial and thrust roller bearings, each comprising an inner ring, an outer ring and rollers therebetween, the inner rings being mounted fast on the respective ends of the axle, the outer rings being mounted in the respective housings and capable of lateral movement therein, and means located in the housings for limiting the amplitude of such lateral movement.

3. The combination with a car axle having an outwardly facing shoulder inwardly of each end and a screw thread at the end, a pair of radial and thrust roller bearings the inner rings or race members of which being mounted on the respective ends of the axle, and nuts on the screw threads for clamping the rings against the shoulders, a frame, housings secured to the frame, the housings being formed with seats for the outer rings of the bearings, there being an inwardly facing shoulder of each such seat for engaging the side face of the bearing ring seated therein and limiting the outward movement of such ring.

In testimony whereof, I have affixed my signature hereto.

HAROLD E. BRUNNER.